May 21, 1929.  W. W. CREWS  1,714,348

CHUFA GATHERING APPARATUS

Filed Oct. 3, 1924

W. W. Crews
INVENTOR

Patented May 21, 1929.

1,714,348

UNITED STATES PATENT OFFICE.

WILLIAM W. CREWS, OF BEACH, GEORGIA.

CHUFA-GATHERING APPARATUS.

Application filed October 3, 1924. Serial No. 741,484.

My present invention pertains to separating apparatus, and has for its general object to provide an apparatus through the medium of which chufas may be expeditiously detached from their vines and separated from dirt and also from vine particles and other trash.

To the attainment of the foregoing, the invention consists in the improvement as hereinafter described and definitely claimed.

In the accompanying drawings, forming part of this specification:—

Similar numerals of reference designate corresponding parts in all of the views of the drawings.

Figure 1:
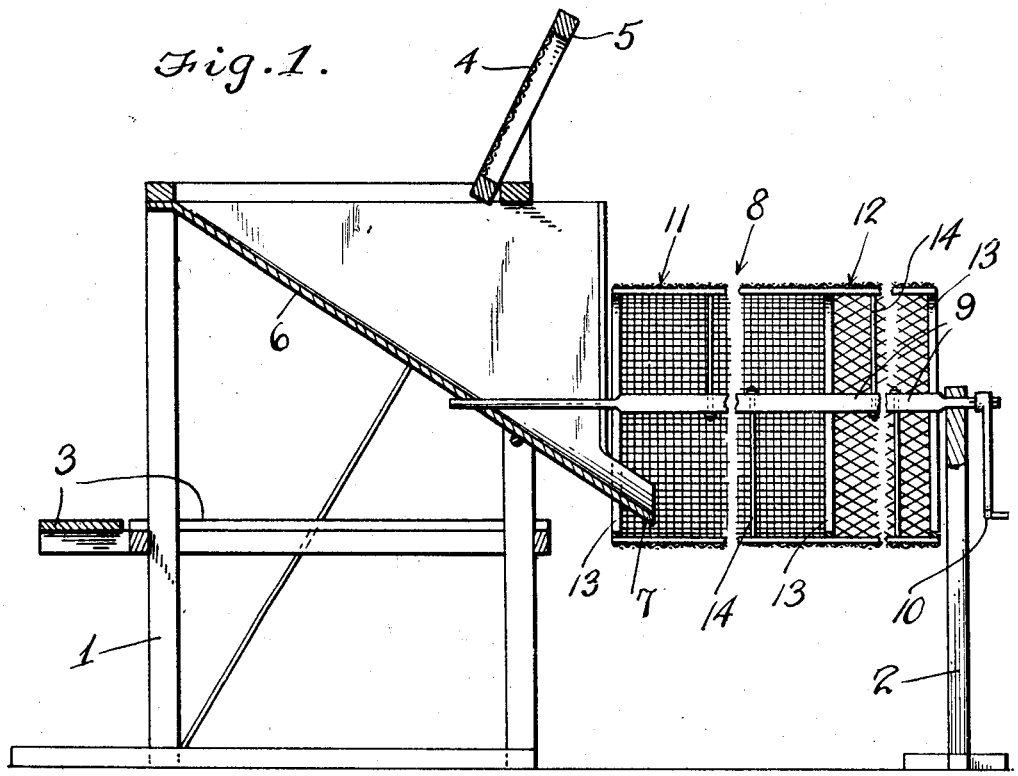
Figure 1 is a longitudinal vertical section of the apparatus with the drum broken.

Among other elements my novel apparatus comprises a main frame 1 which may be of the construction illustrated or of any other construction compatible with its purpose. Placed about the proportional distance illustrated from the frame 1 is a fixed standard 2 hereinafter referred to.

In addition to the main frame 1 and the standard 2 the apparatus comprises platforms 3 located on the main frame 1 and designed to support operators in proper position to enable them to beat chufa-bearing vines against the top of the frame with a view to detaching chufas from the vines and at the same time separating some of the dirt from the chufas. A screen 4 carried by a frame 5 appropriately fixed to the upper forward portion of the main frame 1 and extending above said main frame 1 in an inclined position as illustrated in Figure 1, serves to catch flying nuts that spring off the vines that are beaten by the operator standing on the front platform 3.

Figure 2:
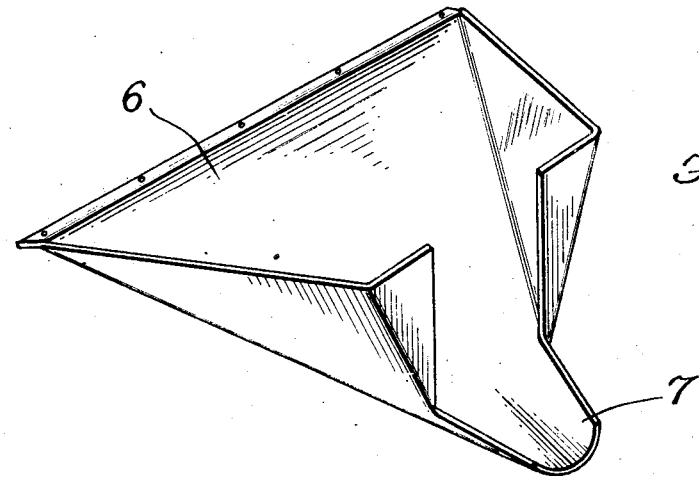
Figure 2 is a perspective view of the combined hopper and chute comprised in the apparatus.

Arranged in and appropriately fixed to the main frame 1 is a combined hopper and chute 6 which is preferably shaped as shown in Figure 2 and is located below the open frame top to receive chufas, dirt and vine particles and other trash, and is provided with a discharge spout 7 which extends forwardly and downwardly relative to the main frame 1 as clearly illustrated in Figure 1.

The said spout 7 of the combined hopper and chute 6 is arranged as illustrated in the receiving end of a revoluble drum 8, the said drum 8 being open at its ends and being carried by a shaft 9, journalled in the standard 2 and the combined hopper and chute 6, and provided outwardly beyond the standard 2 with a crank 10 or other means for transmitting rotary motion to the drum. The cylindrical portion of the drum 8 adjacent to the combined hopper and chute 6 is formed of wire mesh 11 with comparatively small interstices, while the cylindrical forward portion 12 of the drum is formed of wire mesh with comparatively large interstices. From this it follows that when commingled chufas, dirt and trash are discharged from the combined hopper and chute 6 into the receiving portion of the drum 8, the wire mesh 11 will permit dirt to drop from the chufas and trash while the chufas and trash will be fed forwardly toward the discharge end of the drum 8. Manifestly, when the chufas reach the wire mesh portion 12 of the drum the chufas will drop through the interstices of said portion 12 into a container placed to receive them. Trash, however, will be fed through and discharged from the forward open end of the drum 8. At this point I would have it distinctly understood that it is within the purview of my invention to incline the drum 8 so that the forward end thereof will be lower than the rear receiving end, the inclination being desirable in many cases to accelerate the passage of chufas and trash lengthwise of the drum.

As best shown in Figure 1, the drum 8 in addition to the shaft 9 and the cylindrical portions 11 and 12 includes hoops 13 and diametrical braces 14 interposed between the shaft 9 and the cylindrical portions 11 and 12.

In the practical use of my novel apparatus, it will be manifest that an attendant can conveniently beat vines against the top of the frame 1 to separate chufas, dirt, etc., from the vines, and may then throw the vines to one side of the apparatus. The chufas, dirt, etc., so separated from the vines will gravitate into the combined hopper and chute 6 and will be conducted by the latter to the drum 8, and incident to the passage of the chufas through the drum 8, the chufas will be cleared of dirt and by dropping through the interstices of the drum portion 12 will be separated from the vine portions and other trash which latter will be discharged from the forward end of the drum 8.

As before stated the screen 4 serves to prevent nuts that fly off the vines from flying forwardly over the drum 8. On the other hand said screen 4 guides the nuts which strike thereagainst down through the upper portion of the frame 1 and to the chute 6.

Practical experience has demonstrated that by the use of my novel apparatus a large quantity of chufas may be gathered in a short period of time, and this with but little effort on the part of one or more attendants.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claim.

Having described my invention, what I claim and desire to secure by Letters-Patent, is:

In an apparatus of the character described, a frame, a combined hopper and chute supported on said frame in an inclined position and being formed with a restricted spout centrally of its bottom, and parallel oppositely disposed inturned confronting ears formed on said hopper above said spout, and upon opposite sides thereof, to guide material therethrough.

In testimony whereof I affix my signature.

WILLIAM W. CREWS.